United States Patent [19]
Nguyen et al.

[11] Patent Number: 5,717,585
[45] Date of Patent: Feb. 10, 1998

[54] POWER INVERTER WITH REDUCED SWITCHING FREQUENCY

[75] Inventors: Vietson M. Nguyen; Shan-Chin Tsai, both of Rockford, Ill.

[73] Assignee: Sundstrand Corporation, Rockford, Ill.

[21] Appl. No.: 686,648

[22] Filed: Jul. 24, 1996

[51] Int. Cl.$^6$ .................................................. H02M 3/24
[52] U.S. Cl. .................................................. 363/98; 363/132
[58] Field of Search ................................ 363/132, 26, 41, 363/37, 39, 97, 98

[56] References Cited

U.S. PATENT DOCUMENTS

| | | | |
|---|---|---|---|
| 4,233,658 | 11/1980 | Lupatin et al. | 363/26 |
| 4,489,371 | 12/1984 | Kernick | 363/41 |
| 4,672,521 | 6/1987 | Riesco | 363/41 |
| 4,694,383 | 9/1987 | Nguyen et al. | 363/17 |
| 5,045,989 | 9/1991 | Higaki et al. | 363/37 |
| 5,053,939 | 10/1991 | Kirchberg, Jr. et al. | 363/41 |
| 5,327,335 | 7/1994 | Maddali | 363/39 |
| 5,434,481 | 7/1995 | Nilssen | 315/247 |

*Primary Examiner*—Peter S. Wong
*Assistant Examiner*—Rajnikant B. Patel
*Attorney, Agent, or Firm*—Antonelli, Terry, Stout & Kraus

[57] ABSTRACT

An inverter system (10) in accordance with the invention includes an electrical load (R,L) having a direct current source (E) for providing direct current to at least one pair of inverter switches $Q_1$ and $Q_2$ with the at least one pair of switches being switched between conducting and non-conducting states to control a direction of flow of current pulses between the direct current source and the electrical load to cause the flow of alternating current through the electrical load; a source of a voltage reference ($V_{ref}$) representing a desired form of the alternating current to flow through the electrical load; an error control signal generator (24) having a first input coupled to the electrical load and a second input coupled to the voltage reference for generating on an output (26) an error control voltage representing a difference between the first and second inputs; and an inverter controller (16), coupled to the output of the error control signal generator and to the inverter, for controlling a frequency of switching of the at least one pair of switches in response to the error control voltage to produce current pulses flowing through the electrical load occurring at a variable frequency which provides the alternating current flow through the electrical load.

17 Claims, 5 Drawing Sheets

POWER INVERTER WITH REDUCED SWITCHING FREQUENCY

TECHNICAL FIELD

The present invention relates to high power inverters, such as those used in variable speed constant frequency (VSCF) electrical power generating systems in airframes having high KVA ratings.

BACKGROUND ART

VSCF electrical power generating systems utilize a three phase alternator which is driven at a variable speed by a power takeoff from a thrust engine of an airframe as a source of alternating current which is rectified to provide a DC source to a three phase inverter for generating three phase 400 Hz. alternating current. High power inverters have high KVA ratings of often 15 KVA or above as part of a three phase such as a 45/60 KVA inverter. High power inverters of this type require the output of 400 Hz. AC to not have an excessive total harmonic distortion which may be a range of 3%–5% up to the 50th harmonic which has been set as a standard in the industry for the generation of alternating current in airframes.

Control of VSCF power inverters has been based on the classic method of controlling the average or RMS value of the power output fundamental frequency sine wave but not the quality of the sine wave itself. In this type of system, pulse width modulation of pulses generated by a constant frequency squarewave source is used to generate the desired fundamental of each phase under the control of a reference waveform generated by reading out values stored in a read only memory (ROM). The output voltage waveform is maintained to have a high quality sine waveform by filtering the fundamental frequency generated by switching of each phase's inverter through an output LC filter. This approach has been called closed loop in terms of control of the RMS value of the fundamental frequency sine wave. However, the quality and phase of the sine wave is in reality not regulated which results in an open loop control. These systems do not compare the reference waveform generated from readout from a ROM with the actual output power waveform to generate an error control voltage which is used to modulate the duty cycle of the pulse width modulator to precisely control generation of the fundamental frequency alternating current with a low total harmonic distortion.

In a VSCF inverter, the quality of the fundamental is maintained as if the load is passive in nature, such as a resistor, inductor, or capacitor or combination thereof. However, when a rectifier load or a triac load is present, there are a substantial number of harmonics created by the non-linearity of the power drawn by the switching characteristic of the rectifier or triac. These non-linear loads distort the fundamental frequency badly causing an unacceptable total harmonic distortion which may be above the 3% to 5% limit.

Prior VSCF inverter controllers do not compensate for distortion present in the output voltage produced by non-linear loads because the RMS value of the output voltage which is used as the control parameter is relatively unchanged in response to a non-linear load. However, there is a need for control of high power inverters to provide high quality and high power alternating current having a fundamental frequency substantially free of total harmonic distortion within parameters of the aforementioned industry standard while permitting non-linear loads to be driven.

In order to provide rapid response time to variable electrical loads, such as non-linear loads, it is necessary for the power switches in an inverter to switch at high rates, such as 40 KHz or above. However, the best high power solid state switches, such as IGBTs available on the market today, do not work well above 40 KHz. If the total harmonic distortion up to the 50th harmonic is required to be within a 3%–5% limit, it is necessary for the switching frequency to be reduced to avoid excessive harmonic power up to the 50th harmonic.

Prior art inverter controllers are known which provide control and response to harmonic content of the output power. These prior art controllers analyze the total harmonic content and alter the switching pattern to reduce the harmonic content. This type of inverter controller varies the pulse width of a fixed frequency squarewave having a 50% duty cycle to pulse width modulate the fundamental frequency and to further reduce the content of harmonics to within an acceptable limit in response to the sensed harmonics.

DISCLOSURE OF INVENTION

The present invention provides an inverter for generating high power, such as for applications in VSCF systems, having low total harmonic distortion in which an error control voltage generated by computing the difference between a reference voltage and the output power of the inverter applied to an electrical load is compared to generate an error control voltage used to modulate the switching frequency of power switches in an inverter. The switching frequency of at least one pair of power switches in an inverter is controlled in response to the aforementioned error control voltage to produce current pulses of variable duration flowing through the electrical load occurring at a variable frequency which is lower than the prior art and which produces the fundamental frequency alternating current. The duration of individual pulses is defined by the time interval in which the error control voltage does not exceed a dead zone defined between maximum and minimums of a positive bias signal. The positive bias signal is preferably generated as the absolute value of a periodic signal having the same frequency as the desired fundamental to be generated by the inverter which is a minimum at a peak of the reference signal and a maximum at zero crossing points of the reference signal. Furthermore, the positive bias signal having the foregoing characteristics may be optimized or generated arbitrarily.

In order to achieve the aforementioned industrial standard of a limit of 3%–5% total harmonic distortion, the magnitude of the positive bias signal may be controlled in response to the output of a total harmonic distortion analyzer which reduces the magnitude of the dynamic range of the positive bias signal inversely proportional to the total harmonic distortion present in the output power from the inverter. As a result, as the output power increases in undesirable harmonic content, the dynamic range of the positive bias signal is reduced to reduce the total harmonic distortion content. As a result, while the resultant switching frequency must go up, it is still possible to operate high power switching devices, such as IGBTs, which represent the best switching devices in the industry today for use in high power inverters, within a frequency range well below their 40 KHz. upper specified limit for proper operation.

The present invention provides an improvement over the prior art by providing truly closed loop control of the output power from a high power inverter which achieves a total harmonic distortion content within industrial limits, such as between 3%–5%, while maintaining the highest switching frequency below that of the upper limit of state of the art high power switching elements such as IGBTs. With the invention, it is possible to respond to variation in the output load to increase the switching frequency of the inverter in response to abrupt load changes while maintaining the switching frequency below the upper limit of the high power switching devices while, at the same time, achieving operation within specified industrial limits of total harmonic distortion.

BRIEF DESCRIPTION OF THE DRAWINGS

Like reference numerals identify like parts throughout the drawings.

BEST MODE FOR CARRYING OUT THE INVENTION

Figure 1:
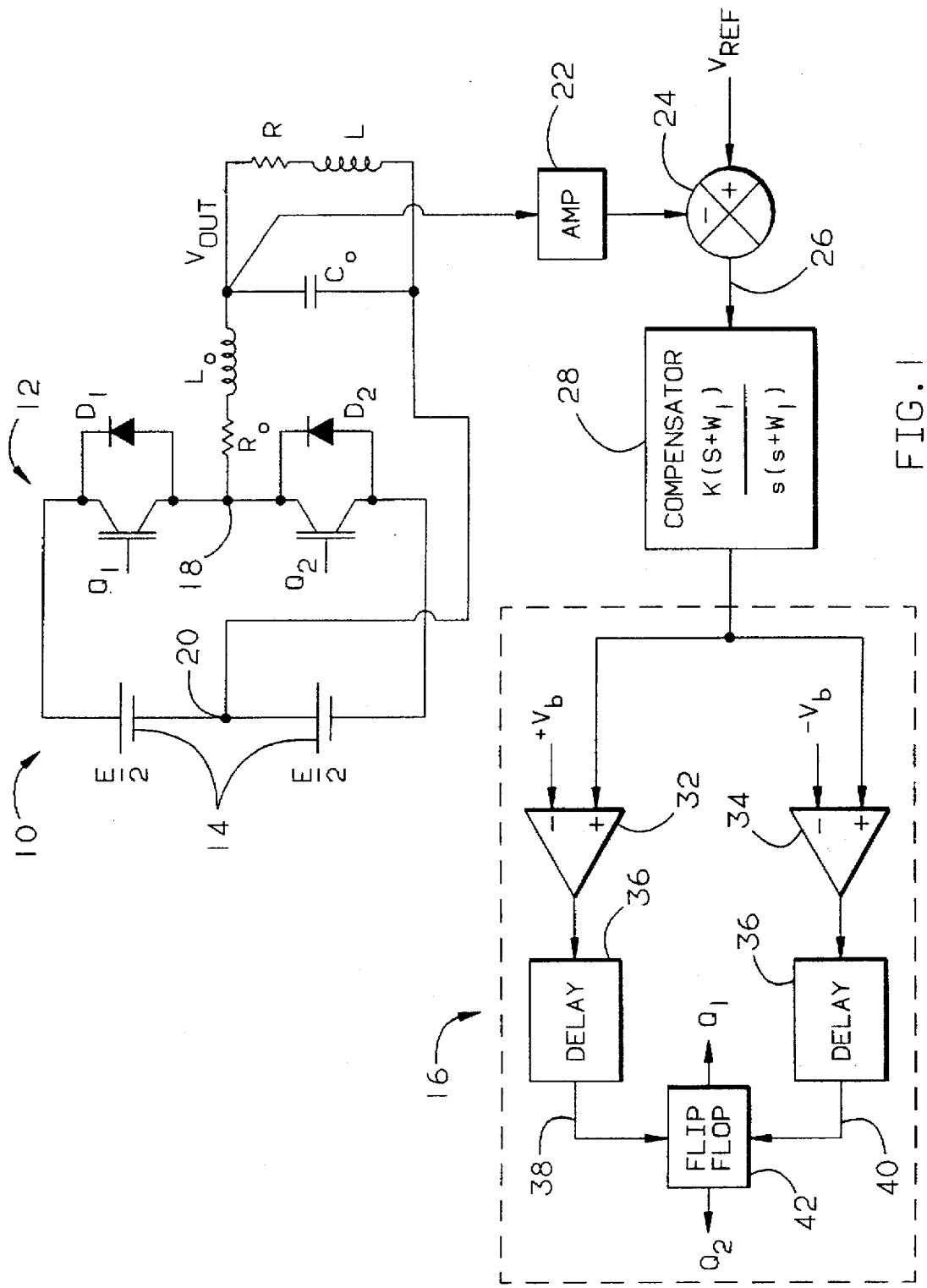
FIG. 1 illustrates a block diagram of an embodiment of the present invention.

FIG. 1 illustrates a block diagram of an inverter system 10 in accordance with the present invention. A conventional inverter 12 having a direct current source 14 provides direct current to at least a pair of inverter switches $Q_1$ and $Q_2$ which may be any well-known power switching element such as an IGBT. An inverter controller 16, as described below, controls the switching states of the power switches $Q_1$ and $Q_2$. The output of the inverter 12 is taken from a midpoint 18 between the power switches $Q_1$ and $Q_2$ which are respectively coupled between ground and the power supply potential E. It should be understood that the inverter, as illustrated in FIG. 1, is only one possible embodiment of an inverter which may be used to practice the invention with other inverters having one or more pairs of switches which are switched between conducting and non-conducting states to control a direction of flow of current pulses also being usable in the practice of the invention. The pulses flow between the direct current source E and the electrical load containing, for example, resistance R and inductance L to cause the flow of alternating current having a desired fundamental frequency through the aforementioned electrical load. Each inverter switch $Q_1$ and $Q_2$ is connected in parallel with a conventional flyback diode $D_1$ and $D_2$, respectively. The midpoint 18 of the inverter is connected through resistance R0 and inductor L0 to a capacitor C0 to provide filtering to suppress undesired harmonics. The midpoint 20 of the power supply potential E, which is maintained at the potential E/2, is connected to the capacitor C0 of the filter comprised also of resistor R0 and L0 and to the electrical load R and L, which is also coupled to the output $V_{out}$. The output $V_{out}$ is connected to amplifier 22 for providing an amplified version of the output potential $V_{out}$ to a control loop to control the frequency of switching of the at least one pair of switches $Q_1$ and $Q_2$ to produce current pulses of variable duration flowing through the electrical load R and L occurring at a variable frequency which provides the alternating current at the fundamental frequency to the aforementioned electrical load. The output of amplifier 22 is connected to a summer 24 which is also connected to a voltage reference $V_{ref}$ which may be generated by a ROM or from an analog voltage source which is the desired voltage waveform to be produced. For example, without limitation, $V_{ref}$ may be 400 Hz. sinusoidal alternating current but the invention is not limited thereto. The summer 24 computes a difference between the output of amplifier 22 and $V_{ref}$ to produce an error control voltage on output 26. The summer 24 functions as an error control signal generator. The output 26 of summer 24 is coupled to a compensator 28 which provides compensation as defined by the equation contained in the compensator block which provides a first order response as defined by a first order differential equation which has the desired stability required for proper operation. The value of W1 is approximately $2\pi \times 100$ KHz. The constant K may vary in accordance with the particular system being used.

The inverter controller 16 controls the time duration between which the first and second switches $Q_1$ and $Q_2$ are maintained in a conducting state to produce the current pulses of duration and variable frequency. The inverter controller 16 is responsive to the error control signal outputted on output 26 of the summer 24 and to a positive bias signal as, for example, illustrated in FIGS. 2(c) and 2(e) as described below, for switching the first switch $Q_1$ off if the error control signal is greater than the positive bias signal +Vb followed by a delay provided by delay 36 after which the second switch $Q_2$ is turned on and for switching the second switch $Q_2$ off if the error control signal is less than a negative value the positive bias signal followed by a delay provided by delay 36 after which the first switch $Q_1$ is turned on. The delay time interval is provided by delays 36 so that a shoot through condition does not exist with both of the switches $Q_1$ and $Q_2$ simultaneously turned on. The inverter controller 16 includes operational amplifiers 32 and 34. Operational amplifier 32 provides an output signal when the output from the compensator 28 exceeds the input +Vb. The operational amplifier 34 provides an output when the output from compensator 28 exceeds −Vb. The delays 36 have outputs 38 and 40 which are connected to the toggling inputs of flip flop 42 which produces a high level output $Q_1$ in response to a high level output from output 38 and a high level output $Q_2$ when a high level output on output 40.

It should be understood that the operational amplifiers 32 and 34 and delays 36 and 38 function as a window comparator (dual comparator) which functions in a manner such that if the error control voltage outputted from compensator 28 is higher than +Vb, then after the time delay, provided by delay 36, the switch $Q_1$ is turned off and the lower switch $Q_2$ is turned on and if the error control voltage is less than −Vb, then after the time delay provided by time delay 36, the switch $Q_2$ is turned off and the upper switch $Q_1$ is turned on. As will be described in more detail below in FIG. 4, the amplitude range of the positive bias Vb can be selected by simulation depending on the design point and may be chosen to be adjustable to provide a switching loss optimizer which measures the total harmonic distortion present in the output $V_{out}$ which then adjusts the amplitude of the dynamic range of the positive bias Vb to control the total harmonic distortion to be within an acceptable level which reduces the switching frequency optimally to minimize switching loss.

Figure 2:
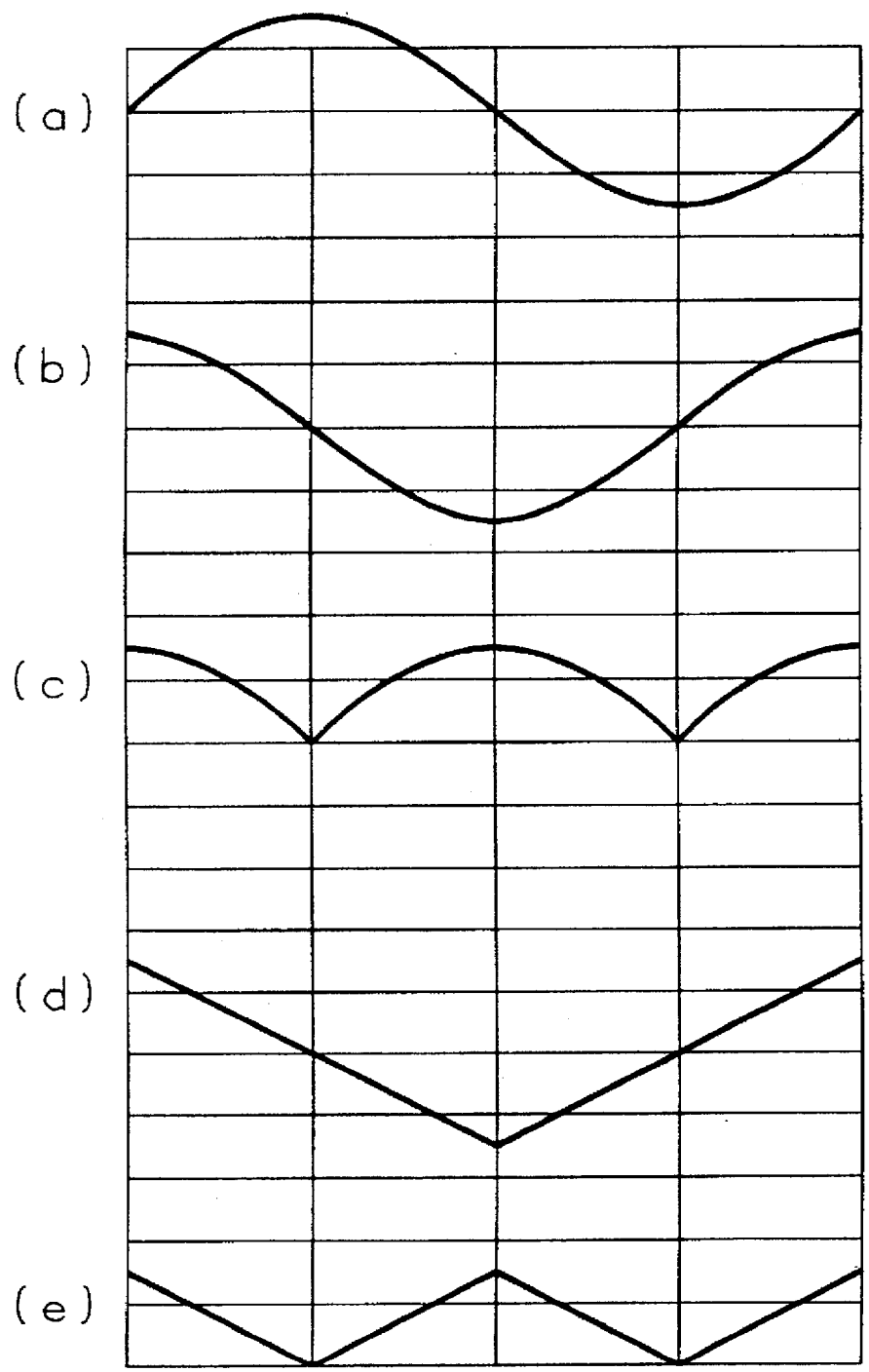
FIGS. 2(a)–2(e) illustrate various waveforms which may be used with the embodiment of FIG. 1.

The waveforms of FIGS. 2(a)–(e) are described as follows. FIG. 2(a) illustrates a desired form of the voltage $V_{ref}$ which may be a sinusoidal voltage of 400 Hz. such as for applications in airframes of the VSCF type. In order to insure that switching of the switches $Q_1$ and $Q_2$ does not occur at an unacceptably high rate, it is necessary for the positive bias signal Vb to be generated synchronously with the occurrences of maximums and minimums of the voltage reference $V_{ref}$ as illustrated in FIG. 2(a). One type of positive bias signal, as illustrated in FIG. 2(c) having the foregoing characteristics, which has a dynamic range periodically varying between a minimum and a maximum, is generated by a cosine function, as illustrated in FIG. 2(b), having the same frequency as the voltage reference $V_{ref}$ of FIG. 2(a). As is well known, the cosine function, as illustrated in FIG. 2(b), is orthogonal at all points to the sinusoidal function of FIG. 2(a). When the absolute value of the cosine function of FIG. 2(b) is produced, the resultant waveform of FIG. 2(c) is generated in which a minimum occurs in response to each maximum of the voltage reference $V_{ref}$ of FIG. 2(a) and a maximum occurs at each zero crossing point. Alternatively, another form of the positive bias signal having the foregoing characteristics is a triangle waveform, as illustrated in FIG. 2(d), which may be processed to produce an absolute value function having the triangular waveform of FIG. 2(e) which varies between a minimum and a maximum so that each minimum occurs in response to a maximum of the waveform $V_{ref}$ and each maximum occurs in response to a zero crossing point of the waveform $V_{ref}$.

When the positive bias signal, such as illustrated in FIGS. 2(c) and 2(e) is provided, a dead zone is produced in which either the upper switch $Q_1$ or the bottom switch $Q_2$ is maintained in an "on" state for a time interval between the error control voltage first exceeding either the positive bias signal or a negative thereof which caused the initial turn on of switch $Q_1$ or $Q_2$ and the error control voltage exceeding the opposite limit of the positive bias signal. The resultant dead zone reduces the switching frequency to be within switching rates for state of the art, high power, solid state switches such as IGBTs and provides acceptable total harmonic distortion within limits such as 3%–5% as specified for power generated for the airline industry.

Figure 3:
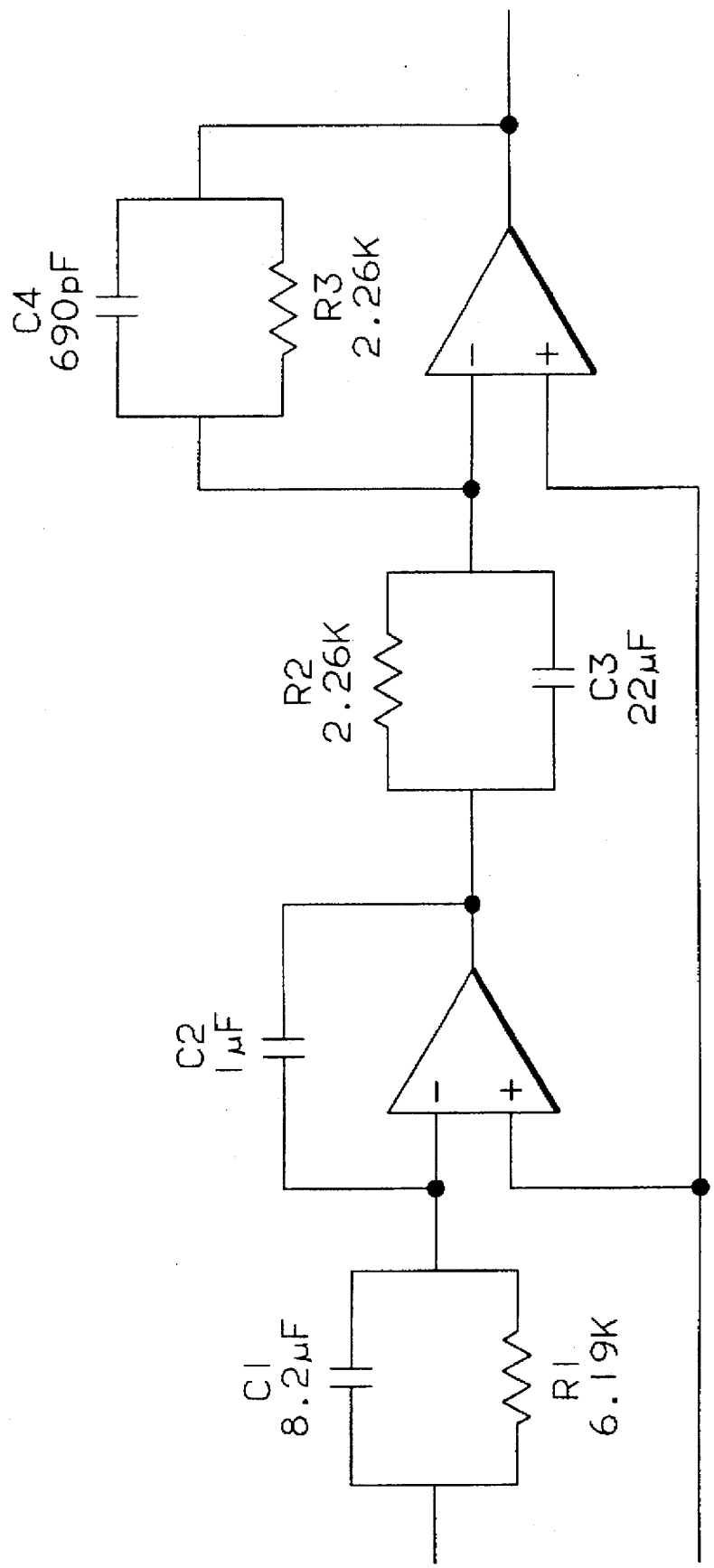
FIG. 3 is an embodiment of the compensator utilized in FIG. 1.

FIG. 3 illustrates a block diagram of a suitable compensator 28. The compensator provides lead lag compensation to insure operation in accordance with first order differential equations with acceptable stability. It should be understood that the compensator 28 may take other forms than is illustrated in FIG. 1. Each of the capacitors C1–C4 and each of the resistors R1–R3 may utilize standard component values such as, but not limited to, those as illustrated.

Figure 4:
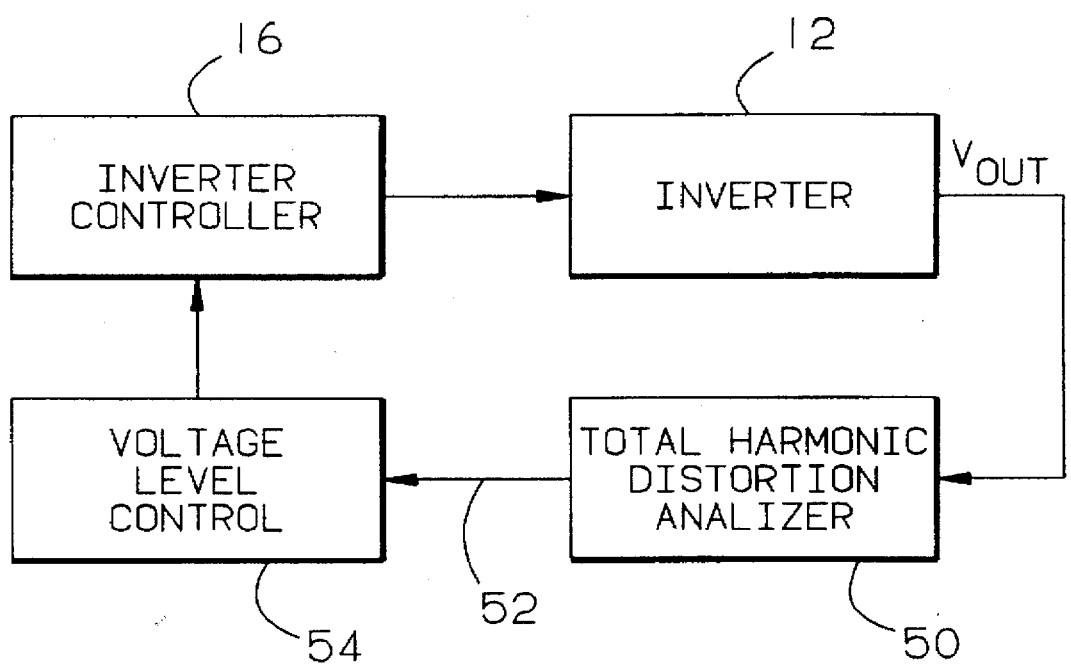
FIG. 4 is a block diagram of an additional embodiment of the present invention which controls the dynamic magnitude of the positive bias signal in response to the total harmonic distortion present in the output of the inverter of the present invention.

FIG. 4 illustrates a block diagram of an additional embodiment of the present invention which provides compensation in response to the total harmonic distortion present in the output signal $V_{out}$ of FIG. 1. The output $V_{out}$ of inverter 12 is coupled to a total harmonic distortion analyzer 50 which provides an output signal 52 which is proportional to the total percentage of harmonics up to the 50th harmonic present in the output $V_{out}$. The magnitude of the signal on output 52 representing the total harmonic distortion up to the 50th harmonic is applied to the voltage level control 54 which scales the dynamic range of the positive bias signal, such as illustrated in FIGS. 2(c) and 2(e) to vary between a minimum and a maximum limit. As the magnitude of the total harmonic distortion increases, it is necessary to decrease the switching frequency of the switches $Q_1$ and $Q_2$. As can be seen from FIGS. 5(a) and 5(b) as described below, which respectively illustrate a positive bias signal in accordance with FIGS. 2(c) and 2(e), as the magnitude of the positive bias signal decreases, the total harmonic distortion also decreases.

Figure 5A:
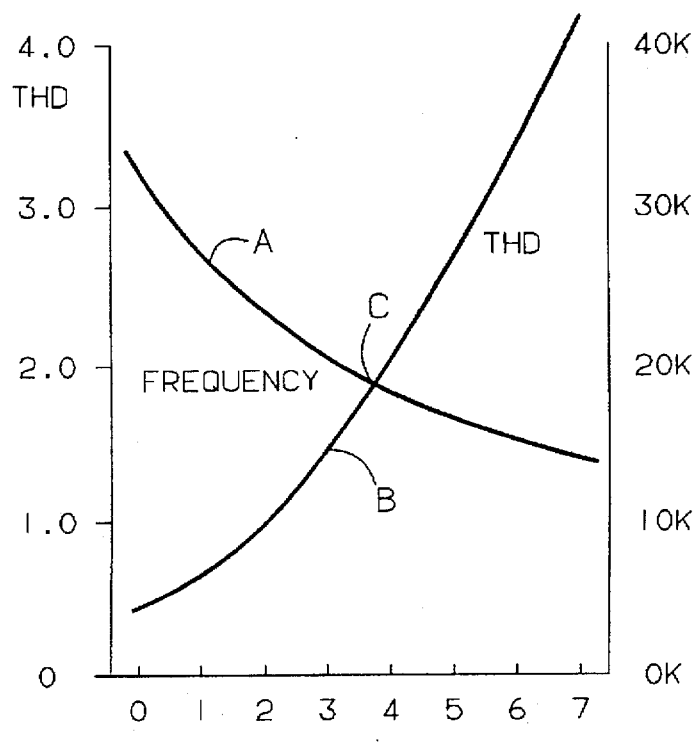
FIGS. 5(a) and 5(b) illustrate the response characteristic of the embodiment of FIG. 1, respectively, when the positive bias signal is a sinusoidal waveform and a triangular waveform.
Figure 5B:
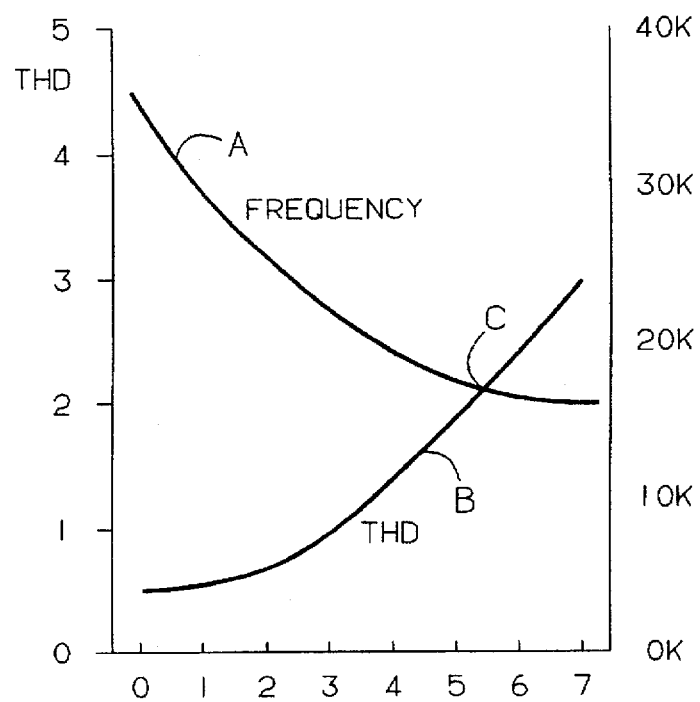

FIGS. 5(a) and 5(b) respectively illustrate data produced with a positive bias signal of a cosine format as illustrated in FIG. 2(c) with respect to the voltage reference $V_{ref}$ of FIG. 2(a) which is a sine function and a triangular waveform as illustrated in FIG. 2(e). The data points were generated with a time delay of 3.75 μsec. The output load R equaled 0.88 ohms at full load rated at 15 Kilowatts. Additional parameters where the load was fully resistive, L equaled 88 microhenrys, the resistance of the inductor L equaled 0.1 ohms and the capacitance $C_0$ equaled 50 microfarads. The Y axis on the left of FIGS. 5(a) and 5(b) equals the percentage of total harmonic distortion and the Y axis on the right equals the switching rate in kilohertz. The X axis equals the relative magnitude of the dynamic range of the positive bias signal. Curve A in FIGS. 5(a) and 5(b) illustrates that the switching frequency decreases in response to an increasing magnitude of the dynamic range of the positive bias signal. Curve B illustrates that the total harmonic distortion decreases in response to decreasing dynamic range of the positive bias signal. The optimal operation point occurs at the intersection C of each curve. As may be seen, the characteristic at the point C for both a positive bias signal of a cosine format of FIG. 2(c) and a triangular format of FIG. 2(e) provide switching rates below 20 KHz. with a total harmonic distortion in the vicinity of 2% which is well within acceptable industrial limits of total harmonic distortion and further well within switching response rates of state of the art high power solid state switches such as IGBTs.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. An inverter system comprising:
   an electrical load;
   an inverter having a direct current source for providing direct current to at least one pair of inverter switches with the at least one pair of switches being switched between conducting and non-conducting states to control a direction of flow of current pulses between the direct current source and the electrical load to cause the flow of alternating current through the electrical load;
   a source of a voltage reference, the voltage reference representing a desired form of the alternating current to flow through the electrical load;
   an error control signal generator having a first input coupled to the electrical load and a second input coupled to the voltage reference for generating on an output an error control voltage representing a difference between the first and second inputs; and
   an inverter controller, coupled to the output of the error control signal generator and to the inverter, for controlling a frequency of switching of the at least one pair of switches in response to the error control voltage to produce current pulses flowing through the electrical load occurring at a variable frequency which produces the alternating current flow through the electrical load; and wherein;
   the at least one pair of switches comprises a first switch and a second switch with conduction of the first switch and non-conduction of the second switch causing current to flow through the electrical load in a first direction and with non-conduction of the first switch and conduction of the second switch causing current to flow through the electrical load in a second direction opposite the first direction; and the inverter controller comprises a comparator having first and second outputs respectively coupled to control terminals of the first and second switches for controlling switching states thereof which is responsive to the error control signal and a positive bias signal for switching the first switch off if the error control signal is greater than the positive bias signal followed by a delay after which the second switch is turned on and for switching the second switch off if the error control signal is less than a negative value of the positive bias signal followed by a delay after which the first switch is turned on.

2. An inverter system in accordance with claim 1 wherein: the positive bias signal is a signal having a minimum at a peak of the voltage reference and a maximum at zero crossing points of the voltage reference.

3. An inverter system in accordance with claim 2 wherein: the voltage reference is one of a sine or a cosine function varying at a fundamental frequency; and the positive bias signal equals an absolute value of one of a sine or a cosine function varying at the fundamental frequency which is orthogonal to the voltage reference.

4. An inverter system in accordance with claim 2 wherein: the positive bias signal is an absolute value of a triangular function which is zero at maximum points of the voltage reference and a maximum at zero crossing points of the voltage reference.

5. An inverter system in accordance with claim 1 further comprising:

a total harmonic distortion analyzer, coupled to alternating current flowing through the electrical load, for producing on an output an output signal which is a function of a total harmonic distortion in the alternating current flowing through the electrical load; and a voltage level control coupled to the output of the total harmonic distortion analyzer and to a source of the positive bias signal to control the frequency of switching of the first and second switches inversely in proportion to a magnitude of the output of the total harmonic distortion analyzer.

6. An inverter system in accordance with claim 2 further comprising:

a total harmonic distortion analyzer, coupled to alternating current flowing through the electrical load, for producing on an output an output signal which is a function of a total harmonic distortion in the alternating current flowing through the electrical load; and a voltage level control coupled to the output of the total harmonic distortion analyzer and to a source of the positive bias signal to control the frequency of switching of the first and second switches inversely in proportion to a magnitude of the output of the total harmonic distortion analyzer.

7. An inverter system in accordance with claim 3 further comprising:

a total harmonic distortion analyzer, coupled to alternating current flowing through the electrical load, for producing on an output an output signal which is a function of a total harmonic distortion in the alternating current flowing through the electrical load; and a voltage level control coupled to the output of the total harmonic distortion analyzer and to a source of the positive bias signal to control the frequency of switching of the first and second switches inversely in proportion to a magnitude of the output of the total harmonic distortion analyzer.

8. An inverter system in accordance with claim 4 further comprising:

a total harmonic distortion analyzer, coupled to alternating current flowing through the electrical load, for producing on an output an output signal which is a function of a total harmonic distortion in the alternating current flowing through the electrical load; and a voltage level control coupled to the output of the total harmonic distortion analyzer and to a source of the positive bias signal to control the frequency of switching of the first and second switches inversely in proportion to a magnitude of the output of the total harmonic distortion analyzer.

9. A method of generating alternating current with an inverter system having an electrical load, an inverter having a direct current source for providing direct current to at least one pair of inverter switches with the at least one pair of switches being switched between conducting and non-conducting states to control a direction of flow of current pulses between the direct current source and the electrical load to cause the flow of alternating current through the electrical load, a source of a voltage reference representing a desired form of the alternating current to flow through the electrical load, an error control signal generator having a first input coupled to the electrical load and a second input coupled to the voltage reference and for generating on an output an error control voltage representing a difference between the first and second inputs, and an inverter controller coupled to the output of the error control signal generator and the inverter comprising;

generating the error control signal in response to the reference voltage and alternating current flowing through the electrical load representing a difference between the reference voltage and a voltage representing the alternating current; and controlling a frequency of switching of the at least one pair of switches in response to the error control voltage to produce current pulses flowing through the electrical load occurring at a variable frequency which produces the alternating current flowing through the electrical load.

10. A method in accordance with claim 9 wherein: the frequency of switching is controlled by switching a first switch of the at least one pair of switches off when the error control signal is greater than a positive bias signal followed by a delay after which a second switch of the at least one pair of switches is turned on and switching the second switch off if the error control signal is less than a negative value of the positive bias signal followed by a delay after which the first switch is turned on.

11. A method in accordance with claim 10 wherein: the positive bias signal is a signal having a minimum at a peak of the voltage reference and a maximum at zero crossing points of the voltage reference.

12. A method in accordance with claim 11 wherein: the voltage reference is one of a sine or a cosine function varying at a fundamental frequency; and the positive signal equals an absolute value of one of a sine or a cosine function varying at the fundamental frequency which is orthogonal to the voltage reference.

13. A method in accordance with claim 11 wherein:

the positive signal is an absolute value of a triangular function being zero at magnitude points of the voltage reference and a maximum at zero crossing points of the voltage reference.

14. A method in accordance with claim 10 further comprising:

analyzing a total harmonic distortion in the alternating current flowing through the electrical load to provide a magnitude of the total harmonic distortion therein; and adjusting a frequency of switching of the first and second switches inversely in proportion to the magnitude of the total harmonic distortion flowing in the electrical load.

15. A method in accordance with claim 11 further comprising:

analyzing a total harmonic distortion in the alternating current flowing through the electrical load to provide a magnitude of the total harmonic distortion therein; and adjusting a frequency of switching of the first and second switches inversely proportional to the magnitude of the total harmonic distortion flowing in the electrical load.

16. A method in accordance with claim 12 further comprising:

analyzing a total harmonic distortion in the alternating current flowing through the electrical load to provide a magnitude of the total harmonic distortion therein; and adjusting a frequency of switching of the first and second switches inversely proportional to the magnitude of the total harmonic distortion flowing in the electrical load.

17. A method in accordance with claim 13 further comprising:

analyzing a total harmonic distortion in the alternating current flowing through the electrical load to provide a magnitude of the total harmonic distortion therein; and adjusting a frequency of switching of the first and second switches inversely proportional to the magnitude of the total harmonic distortion flowing in the electrical load.

* * * * *